US012701428B2

(12) United States Patent
Papa et al.

(10) Patent No.: US 12,701,428 B2
(45) Date of Patent: Aug. 4, 2026

(54) METHODS AND APPARATUSES RELATING TO REPORTING OF USER PLANE INTERRUPTION TIMES

(71) Applicant: Nokia Technologies Oy, Espoo (FI)

(72) Inventors: Arled Papa, Munich (DE); Muhammad Naseer-Ul-Islam, Munich (DE); Halit Murat Gürsu, Munich (DE); Ugur Baran Elmali, Munich (DE); Irina-Mihaela Balan, Munich (DE); Ahmad Awada, Munich (DE); Krzysztof Kordybach, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 302 days.

(21) Appl. No.: 18/416,725

(22) Filed: Jan. 18, 2024

(65) Prior Publication Data

US 2024/0276236 A1    Aug. 15, 2024

(30) Foreign Application Priority Data

Feb. 10, 2023   (GB) ...................................... 2301893

(51) Int. Cl.
*H04W 16/24*     (2009.01)
*H04W 76/20*     (2018.01)

(52) U.S. Cl.
CPC ........... *H04W 16/24* (2013.01); *H04W 76/20* (2018.02)

(58) Field of Classification Search
CPC ..... H04W 16/24; H04W 76/15; H04W 76/20; H04W 76/27
See application file for complete search history.

(56) References Cited

U.S. PATENT DOCUMENTS

| | | | |
|---|---|---|---|
| 2017/0180085 A1* | 6/2017 | Balasubramanian ........................ H04L 1/1858 |
| 2020/0367123 A1* | 11/2020 | Jang .................. H04W 74/0833 |
| 2021/0105681 A1 | 4/2021 | Paladugu et al. |
| 2021/0105688 A1* | 4/2021 | Paladugu .......... H04W 36/0016 |
| 2021/0136638 A1 | 5/2021 | Paladugu et al. |
| 2022/0369178 A1* | 11/2022 | Liu .................. H04W 36/0058 |
| 2022/0417780 A1* | 12/2022 | Liu ........................ H04W 24/10 |
| 2023/0247711 A1* | 8/2023 | Yu .......................... H04W 72/23 370/329 |

FOREIGN PATENT DOCUMENTS

| | | | |
|---|---|---|---|
| WO | 2022/217467 A1 | 10/2022 | |
| WO | WO-2023011077 A1 * | 2/2023 | ............ H04W 24/04 |

OTHER PUBLICATIONS

Notice of Allowance received for corresponding European Patent Application No. 24152353.9, dated Mar. 5, 2025, 8 pages.
(Continued)

*Primary Examiner* — Sam Bhattacharya
(74) *Attorney, Agent, or Firm* — Lippes Mathias LLP

(57)   ABSTRACT

This specification describes a terminal device configured to transmit a message relating to a change or addition of a primary cell of a secondary cell group, the message including (i) information indicative of a first user plane interruption time experienced by the terminal device and associated with the change or addition of the primary cell, and (ii) an indication of a first data radio bearer type to which the first user plane interruption time relates. It also describes a radio access node which receives the message.

18 Claims, 8 Drawing Sheets

(56)                References Cited

OTHER PUBLICATIONS

Extended European Search Report received for corresponding European Patent Application No. 24152353.9, dated Jul. 4, 2024, 10 pages.
"[H074] UP interruption time", 3GPP TSG-RAN WG2 Meeting #118-e, R2-2206100, Agenda item: 6.13.3, Huawei, May 9-20, 2022, 6 pages.
"Analysis of Signalling Impacts by Routing Options", 3GPP TSG-RAN2 Meeting #83bis, R2-133170, Agenda item: 7.2.1, ETRI, Oct. 7-11, 2013, pp. 1-8.
"Split bearer solution for reducing the service interruption time during HO in NR", 3GPP TSG-RAN WG2 Meeting #107, R2-1909298, Agenda item: 11.9.2.2, Nokia, Aug. 26-30, 2019, 5 pages.
"3rd Generation Partnership Project; Technical Specification Group Radio Access Network; Evolved Universal Terrestrial Radio Access (E-UTRA) and NR, Multi-connectivity; Stage 2 (Release 17)", 3GPP TS 37.340, V17.3.0, Dec. 2022, pp. 1-118.
"Revised WID on enhancement of data collection for SON/MDT in NR and EN-DC", 3GPP TSG RAN meeting #88-e, RP-201281, Agenda Item: 9.10.14, CMCC, Jun. 26-Jul. 3, 2020, 5 pages.
"3rd Generation Partnership Project; Technical Specification Group Radio Access Network; Evolved Universal Terrestrial Radio Access (E-UTRA) and NR, Multi connectivity; Stage 2 (Release 17)", 3GPP TS 37.340, V17.2.0, Sep. 2022, pp. 1-112.
"Revised WID: Further enhancement of data collection for SON (Self-Organising Networks)/MDT (Minimization of Drive) Tests) in NR standalone and MR-DC (Multi-Radio Dual Connectivity)", 3GPP TSG RAN meeting #96, RP-221825, Agenda Item: 9.3.3.1, CMCC, Jun. 6-9, 2022, 7 pages.

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.
"On Mobility Robustness Optimization", 3GPP TSG-RAN WG2 #119e, R2-2208177, Agenda Item: 8.13.2, Ericsson, Aug. 17-29, 2022, 8 pages.
"SON/MDT enhancements for SHR and SPCR", 3GPP TSG-RAN WG2 Meeting #119bis-e, R2-2209826, Agenda item: 8.13.4, Samsung, Oct. 10-19, 2022, pp. 1-3.
"Msc-generator", Sourceforge, Retrieved on Jan. 3, 2024, Webpage available at : https://sourceforge.net/projects/msc-generator/.
"Remaining issues on SON enhancement for SPR", 3GPP TSG-RAN WG2 Meeting #120, R2-2212642, Agenda Item: 8.13.4, vivo, Nov. 14-18, 2022, 7 pages.
"Discussion on SPR", 3GPP TSG-RAN WG2 Meeting #120, R2-2211992, Agenda Item: 8.13.4, NTT Docomo, Inc., Nov. 14-18, 2022, 5 pages.
Combined Search and Examination Report received for corresponding United Kingdom Patent Application No. 2301893.0, dated Jul. 28, 2023, 6 pages.
"Pre-meeting summary of 8.13.3 (Huawei)", 3GPP TSG-RAN WG2 Meeting #119 electronic, R2-2208904, Agenda Item: 8.13.3, Huawei, Aug. 17-29, 2022, pp. 1-42.
"Summary of RILs discussion", 3GPP TSG-RAN WG2 #118-e, R2-2206464, Agenda Item: 6.13.3, Ericsson, May 9-20, 2022, pp. 1-34.
"Interruption analysis on mobility events", 3GPP TSG-RAN WG3 Meeting #91bis, R3-160620, Agenda item: 20, ZTE Corporation, Apr. 11-15, 2016, 12 pages.

* cited by examiner

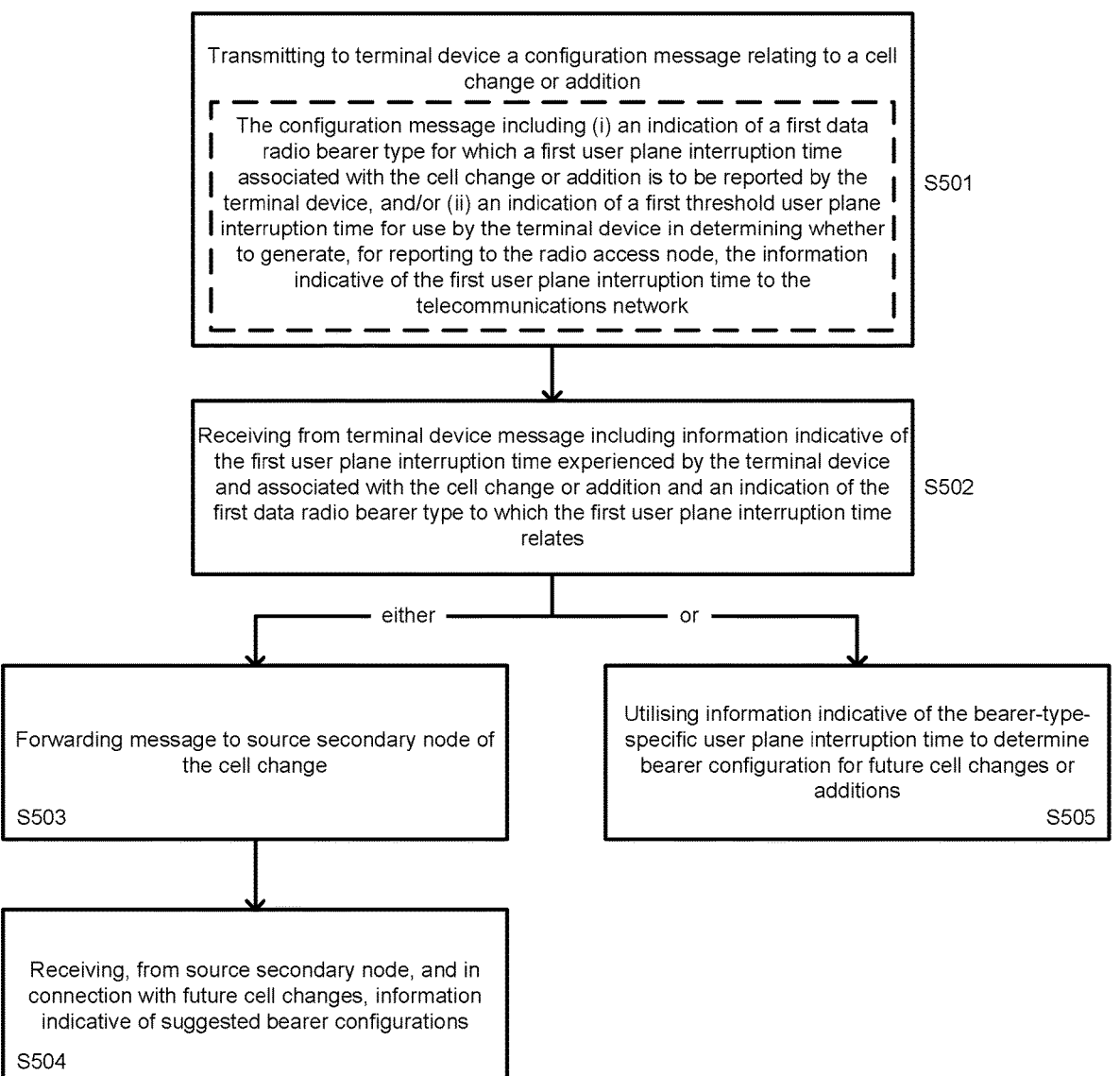

Transmitting to terminal device a configuration message relating to a cell change or addition The configuration message including (i) an indication of a first data radio bearer type for which a first user plane interruption time associated with the cell change or addition is to be reported by the terminal device, and/or (ii) an indication of a first threshold user plane interruption time for use by the terminal device in determining whether to generate, for reporting to the radio access node, the information indicative of the first user plane interruption time to the telecommunications network

S501

Receiving from terminal device message including information indicative of the first user plane interruption time experienced by the terminal device and associated with the cell change or addition and an indication of the first data radio bearer type to which the first user plane interruption time relates

S502 either                                        or

Forwarding message to source secondary node of the cell change

S503

Utilising information indicative of the bearer-type-specific user plane interruption time to determine bearer configuration for future cell changes or additions

S505

Receiving, from source secondary node, and in connection with future cell changes, information indicative of suggested bearer configurations

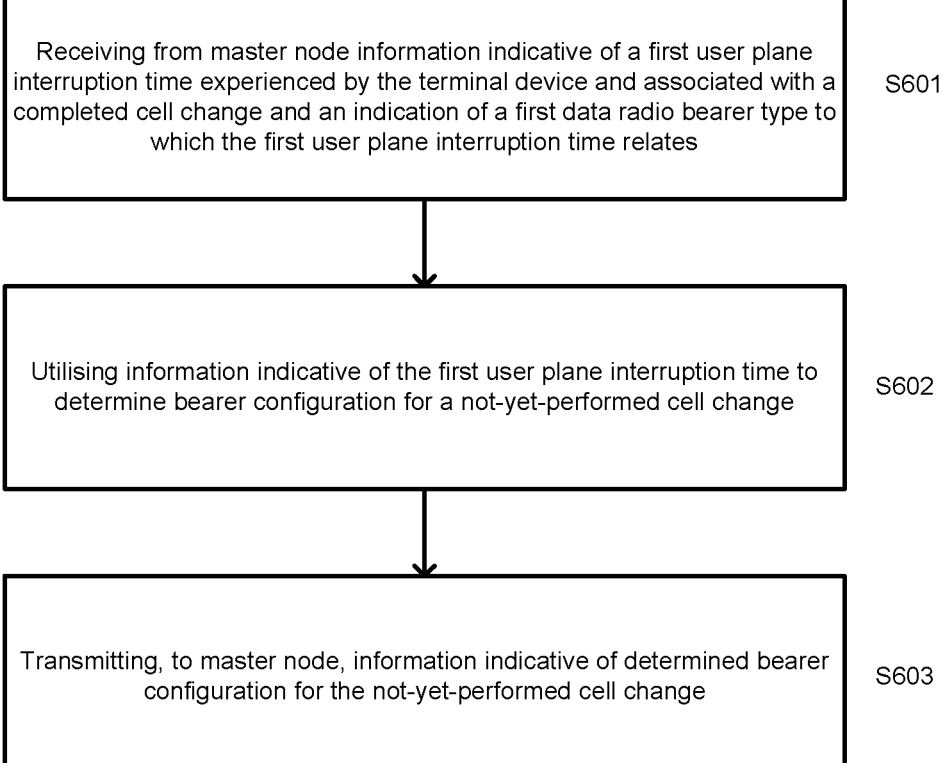

Receiving from master node information indicative of a first user plane interruption time experienced by the terminal device and associated with a completed cell change and an indication of a first data radio bearer type to which the first user plane interruption time relates     S601

Utilising information indicative of the first user plane interruption time to determine bearer configuration for a not-yet-performed cell change     S602

Transmitting, to master node, information indicative of determined bearer configuration for the not-yet-performed cell change     S603

FIG. 6

Receiving from master node an Addition Request message to allocate resources for a terminal device UE     S701

Transmitting acknowledgement to master node and one or more bearer-type-specific threshold user plane interruption times     S702

Connecting with terminal device     S703

METHODS AND APPARATUSES RELATING TO REPORTING OF USER PLANE INTERRUPTION TIMES

RELATED APPLICATION

This application claims priority from GB Application No. 2301893.0 filed on Feb. 10, 2023, which is incorporated herein by reference in its entirety.

FIELD

This specification relates generally to reporting and use of user plane interruption times.

BACKGROUND

In modern telecommunication networks, terminal devices (or user equipment, UE) are able to maintain simultaneous connections to two different cells, and so may send/receive packets via both cells. This is known as carrier aggregation and was first introduced for LTE in 3GGP Release 12. For 5G in 3GPP Release 15, the concept was expanded so that a terminal device can be connected via different radio access technologies (RATs) to both LTE E-UTRA and 5G NR nodes, with the core network (CN) being either the LTE EPC or the 5G Core. This was later expanded so that both cells can belong to 5G NR, in which case the core network is exclusively the 5G Core. These various options come under the general term Multi-Radio Dual Connectivity (MR-DC). MR-DC can offer a terminal device more resources for higher throughput. In addition, it can help operators improve mobility robustness and handovers in macro/micro-cell deployments.

SUMMARY

In a first aspect, this specification describes a terminal device comprising means for transmitting a message relating to a change or addition of a primary cell of a secondary cell group, the message including (i) information indicative of a first user plane interruption time experienced by the terminal device and associated with the change or addition of the primary cell, and (ii) an indication of a first data radio bearer type to which the first user plane interruption time relates. The first user plane interruption time may be indicative of a time elapsed between a) either receipt of a command to change or add the primary cell or receipt of a last user plane data packet prior to the change or addition of the primary cell, and b) a first user plane data packet received at the terminal device, via a data radio bearer of the first data radio bearer type, after the change or addition of the primary cell. The terminal device may further comprise means for receiving, from a radio access node and prior to transmitting the message, an indication of a first threshold user plane interruption time for use by the terminal device in determining whether to generate, for reporting to the radio access node, the information indicative of the first user plane interruption time. In such examples, the message may be generated responsive to a determination that the first user plane interruption time exceeds the first threshold user plane interruption time. The terminal device may further comprise means for receiving, from a radio access node and prior to transmitting the message, a prior message including an indication of the first data radio bearer type for which the first user plane interruption time is to be reported by the terminal device.

The prior message may further include an indication of a second data radio bearer type for which a second user plane interruption time is to be reported by the terminal device, the second user plane interruption time being associated with the change or addition of the primary cell and relating to the second data radio bearer type. The prior message may further include an indication of a third data radio bearer type for which a third user plane interruption time, associated with the change or addition of the primary cell and relating to the third data radio bearer type, is not to be reported by the terminal device.

The terminal device may further comprise means for receiving, from the radio access node and prior to transmitting the message, an indication of a second threshold user plane interruption time, which may (or may not) be different from the first threshold user plane interruption time, for use by the terminal device in determining whether to generate, for reporting to the radio access node, information indicative of a second user plane interruption time associated with the change or addition of the primary cell and relating to a second data radio bearer type.

The message may further include a second user plane interruption time associated with the change or addition and an indication of a second data radio bearer type to which the second user plane interruption time relates.

The indication of the first data radio bearer type and/or the second data radio bearer type and/or the third data radio bearer type data radio bearer type indicates one of a secondary cell group bearer, a master cell group bearer, and a split bearer.

In a second aspect, this specification describes a radio access node comprising means for receiving a message relating to a change or addition of a primary cell of a secondary cell group, the message including (i) information indicative of a first user plane interruption time experienced by a terminal device and associated with the change or addition of the primary cell and (ii) an indication of a first data radio bearer type to which the first user plane interruption time relates.

The radio access node may further comprise means for transmitting, to the terminal device and prior to receiving the message, a prior message which includes an indication of the first data radio bearer type for which the first user plane interruption time is to be reported by the terminal device.

The radio access node may further comprise means for transmitting, to the terminal device and prior to receiving the message, an indication of a first threshold user plane interruption time for use by the terminal device in determining whether to generate, for reporting to the radio access node, the information indicative of the first user plane interruption time. In such examples, the radio access node may further comprise means for receiving, prior to transmission of the indication of the first threshold user plane interruption time to the terminal device, the indication of the first threshold user plane interruption time from a second radio access node, the second radio access node being associated with a target primary cell during the change or addition of the primary cell.

The radio access node may further comprise means for utilising the information indicative of the first user plane interruption time associated with the change or addition of the primary cell and the indication of the first data radio bearer type to which the first user plane interruption time relates in connection with at least one of: identifying another target primary cell for a future change of the primary cell; determining a radio data bearer type for a future change or addition of the primary cell; determining whether to perform bearer remapping during a future change or addition of the primary cell; and identifying another target primary cell for a future addition of a primary cell.

In some examples in which the message relates to the change of the primary cell, the radio access node may comprise means for forwarding, to a further radio access node associated with the primary cell, the information indicative of the first user plane interruption time associated with the change of the primary cell, and the indication of the first data radio bearer type to which the first user plane interruption time relates. In such examples, the radio access node may further comprise means for receiving, from the further radio access node, an indication that a subsequent change of the primary cell is required and an indication of a bearer configuration to be utilised by a target primary cell, wherein the bearer configuration to be utilised by the target primary cell is determined by the further radio access node based on the information indicative of the first user plane interruption time associated with the change of the primary cell and the indication of the first data radio bearer type to which the first user plane interruption time relates. The radio access node may further comprise means for receiving, from the further radio access node, an indication of whether bearer remapping should be performed.

In a third aspect, this specification describes a method comprising transmitting, by a terminal device, a message relating to a change or addition of a primary cell of a secondary cell group, the message including (i) information indicative of a first user plane interruption time experienced by the terminal device and associated with the change or addition of the primary cell, and (ii) an indication of a first data radio bearer type to which the first user plane interruption time relates.

The first user plane interruption time may be indicative of a time elapsed between a) either receipt of a command to change or add the primary cell or receipt of a last user plane data packet prior to the change or addition of the primary cell, and b) a first user plane data packet received at the terminal device, via a data radio bearer of the first data radio bearer type, after the change or addition of the primary cell. The method may further comprise receiving, from a radio access node and prior to transmitting the message, an indication of a threshold user plane interruption time for use by the terminal device in determining whether to generate, for reporting to the radio access node, the information indicative of the first user plane interruption time. In such examples, the message may be generated responsive to a determination that the first user plane interruption time exceeds the threshold user plane interruption time.

The method may further comprise receiving, from a radio access node and prior to transmitting the message, a prior message including an indication of the first data radio bearer type for which the first user plane interruption time is to be reported by the terminal device. The prior message may further include an indication of a second data radio bearer type for which a second user plane interruption time is to be reported by the terminal device, the second user plane interruption time being associated with the change or addition of the primary cell and relating to the second data radio bearer type. The prior message may further include an indication of a third data radio bearer type for which a third user plane interruption time, associated with the change or addition of the primary cell and relating to the third data radio bearer type, is not to be reported by the terminal device.

The method may further comprise receiving, from the radio access node and prior to transmitting the message, an indication of a second threshold user plane interruption time, which may (or may not) be different from the first threshold user plane interruption time, for use by the terminal device in determining whether to generate, for reporting to the radio access node, information indicative of a second user plane interruption time associated with the change or addition of the primary cell and relating to a second data radio bearer type.

The message may further include a second user plane interruption time associated with the change or addition and an indication of a second data radio bearer type to which the second user plane interruption time relates.

The indication of the first data radio bearer type and/or the second data radio bearer type and/or the third data radio bearer type data radio bearer type indicates one of a secondary cell group bearer, a master cell group bearer, and a split bearer.

In a fourth aspect, this specification describes a method comprising receiving, at a radio access node, a message relating to a change or addition of a primary cell of a secondary cell group, the message including (i) information indicative of a first user plane interruption time experienced by a terminal device and associated with the change or addition of the primary cell and (ii) an indication of a first data radio bearer type to which the first user plane interruption time relates.

The method may further comprise transmitting, to the terminal device and prior to receiving the message, a prior message which includes an indication of the first data radio bearer type for which the first user plane interruption time is to be reported by the terminal device.

The method may further comprise transmitting, to the terminal device and prior to receiving the message, an indication of a first threshold user plane interruption time for use by the terminal device in determining whether to generate, for reporting to the radio access node, the information indicative of the first user plane interruption time. In such examples, the method may further comprise receiving, prior to transmission of the indication of the first threshold user plane interruption time to the terminal device, the indication of the first threshold user plane interruption time from a second radio access node, the second radio access node being associated with a target primary cell during the change or addition of the primary cell.

The method may further comprise utilising the information indicative of the first user plane interruption time associated with the change or addition of the primary cell and the indication of the first data radio bearer type to which the first user plane interruption time relates in connection with at least one of: identifying another target primary cell for a future change of the primary cell; determining a radio data bearer type for a future change or addition of the primary cell; determining whether to perform bearer remapping during a future change or addition of the primary cell; and identifying another target primary cell for a future addition of a primary cell.

In some examples in which the message relates to the change of the primary cell, the method may comprise forwarding, to a further radio access node associated with the primary cell, the information indicative of the first user plane interruption time associated with the change of the primary cell, and the indication of the first data radio bearer type to which the first user plane interruption time relates. In such examples, the method may further comprise receiving, from the further radio access node, an indication that a subsequent change of the primary cell is required and an indication of a bearer configuration to be utilised by a target primary cell, wherein the bearer configuration to be utilised by the target primary cell is determined by the further radio access node based on the information indicative of the first user plane interruption time associated with the change of the primary cell and the indication of the first data radio bearer type to which the first user plane interruption time relates. The method may further comprise receiving, from the further radio access node, an indication of whether bearer remapping should be performed.

In a fifth aspect, this specification describes apparatus (e.g. a terminal device or a component of a terminal device) comprising at least one processor and at least one memory storing instructions that, when executed by the at least one processor, cause the apparatus at least to perform: transmitting, by a terminal device, a message relating to a change or addition of a primary cell of a secondary cell group, the message including (i) information indicative of a first user plane interruption time experienced by the terminal device and associated with the change or addition of the primary cell, and (ii) an indication of a first data radio bearer type to which the first user plane interruption time relates.

The first user plane interruption time may be indicative of a time elapsed between a) either receipt of a command to change or add the primary cell or receipt of a last user plane data packet prior to the change or addition of the primary cell, and b) a first user plane data packet received at the terminal device, via a data radio bearer of the first data radio bearer type, after the change or addition of the primary cell. The instructions may, when executed by the at least one processor, cause the apparatus to receive, from a radio access node and prior to transmitting the message, an indication of a first threshold user plane interruption time for use by the terminal device in determining whether to generate, for reporting to the radio access node, the information indicative of the first user plane interruption time. In such examples, the message may be generated responsive to a determination that the first user plane interruption time exceeds the first threshold user plane interruption time.

The instructions may, when executed by the at least one processor, cause the apparatus to receive, from a radio access node and prior to transmitting the message, a prior message including an indication of the first data radio bearer type for which the first user plane interruption time is to be reported by the terminal device. The prior message may further include an indication of a second data radio bearer type for which a second user plane interruption time is to be reported by the terminal device, the second user plane interruption time being associated with the change or addition of the primary cell and relating to the second data radio bearer type. The prior message may further include an indication of a third data radio bearer type for which a third user plane interruption time, associated with the change or addition of the primary cell and relating to the third data radio bearer type, is not to be reported by the terminal device.

The instructions may, when executed by the at least one processor, cause the apparatus to receive, from the radio access node and prior to transmitting the message, an indication of a second threshold user plane interruption time, which may (or may not) be different from the first threshold user plane interruption time, for use by the terminal device in determining whether to generate, for reporting to the radio access node, information indicative of a second user plane interruption time associated with the change or addition of the primary cell and relating to a second data radio bearer type.

The message may further include a second user plane interruption time associated with the change or addition and an indication of a second data radio bearer type to which the second user plane interruption time relates.

The indication of the first data radio bearer type and/or the second data radio bearer type and/or the third data radio bearer type data radio bearer type indicates one of a secondary cell group bearer, a master cell group bearer, and a split bearer.

In a sixth aspect, this specification describes apparatus (e.g. a radio access node or a component of a radio access node) comprising at least one processor and at least one memory storing instructions that, when executed by the at least one processor, cause the apparatus at least to receive, at a radio access node, a message relating to a change or addition of a primary cell of a secondary cell group, the message including (i) information indicative of a first user plane interruption time experienced by a terminal device and associated with the change or addition of the primary cell and (ii) an indication of a first data radio bearer type to which the first user plane interruption time relates.

The instructions may, when executed by the at least one processor, cause the apparatus to transmit, to the terminal device and prior to receiving the message, a prior message which includes an indication of the first data radio bearer type for which the first user plane interruption time is to be reported by the terminal device.

The instructions may, when executed by the at least one processor, cause the apparatus to transmit, to the terminal device and prior to receiving the message, an indication of a first threshold user plane interruption time for use by the terminal device in determining whether to generate, for reporting to the radio access node, the information indicative of the first user plane interruption time. In such examples, the instructions may, when executed by the at least one processor, cause the apparatus to receive, prior to transmission of the indication of the first threshold user plane interruption time to the terminal device, the indication of the first threshold user plane interruption time from a second radio access node, the second radio access node being associated with a target primary cell during the change or addition of the primary cell.

The instructions may, when executed by the at least one processor, cause the apparatus to utilise the information indicative of a first user plane interruption time associated with the change or addition of the primary cell and the indication of the first data radio bearer type to which the first user plane interruption time relates in connection with at least one of: identifying another target primary cell for a future change of the primary cell; determining a radio data bearer type for a future change or addition of the primary cell; determining whether to perform bearer remapping during a future change or addition of the primary cell; and identifying another target primary cell for a future addition of a primary cell.

In some examples in which the message relates to the change of the primary cell, the instructions may, when executed by the at least one processor, cause the apparatus to forward, to a further radio access node associated with the primary cell, the information indicative of the first user plane interruption time associated with the change of the primary cell, and the indication of the first data radio bearer type to which the first user plane interruption time relates. In such examples, the instructions may, when executed by the at least one processor, cause the apparatus to receive, from the further radio access node, an indication that a subsequent change of the primary cell is required and an indication of a bearer configuration to be utilised by a target primary cell, wherein the bearer configuration to be utilised by the target primary cell is determined by the further radio access node based on the information indicative of the first user plane interruption time associated with the change of the primary cell and the indication of the first data radio bearer type to which the first user plane interruption time relates. The instructions may, when executed by the at least one processor, cause the apparatus to receive, from the further radio access node, an indication of whether bearer remapping should be performed.

In a seventh aspect, this specification describes a non-transitory computer readable medium comprising program instructions stored thereon for causing performance of any of the methods described with reference to the third or fourth aspects.

BRIEF DESCRIPTION OF THE FIGS

For better understanding of the present application, reference will now be made by way of example to the accompanying drawings in which:

FIGS. 4 to 7 are flowcharts illustrating various operations which may be performed by various entities in accordance with examples described herein;

DETAILED DESCRIPTION

Figure 1:
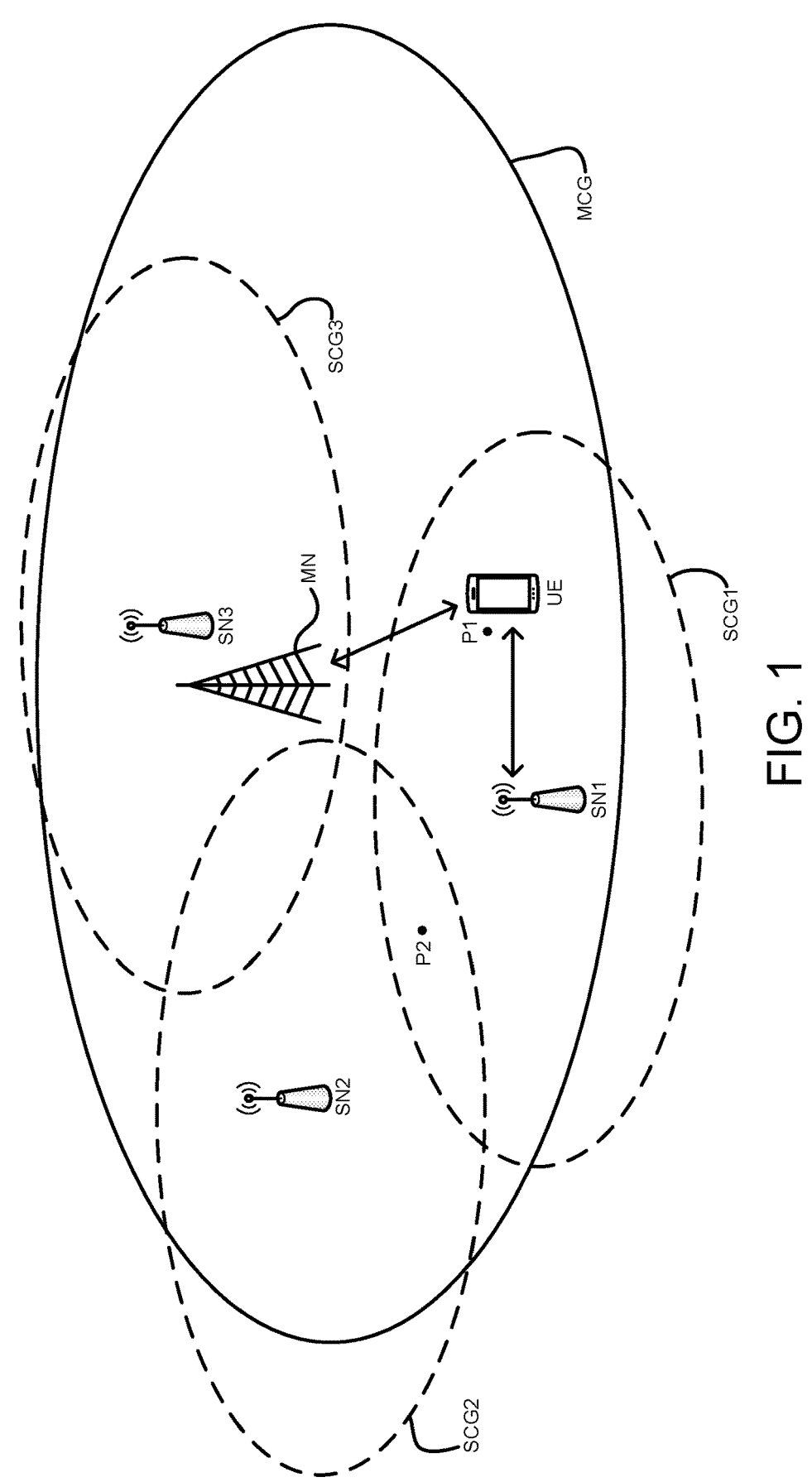
FIG. 1 illustrates a terminal device in an example dual connectivity scenario.

In the description and drawings below, like reference numerals refer to like elements throughout.

FIG. 1 illustrates a terminal device UE within a dual connectivity scenario. The Fig. depicts a portion of a tele-communications network comprising four cells, or more generally four cell groups MCG, SCG1, SCG2, SCG3. The master cell group MCG is a group of serving cells associated with a master node MN. In FIG. 1, only a primary cell (PCell) of the master cell group MCG is illustrated, but the master cell group MCG may additionally include one or more secondary cells (SCells). Also depicted are first to third secondary cell groups SCG1, SCG2, SCG3. As with the master cell group MCG, only the primary cell (PSCell) of the secondary cell groups is depicted, but each of the secondary cell groups may additionally include one or more secondary cells (SCells). Each of the secondary cell groups are associated with a respective secondary node SN1, SN2, SN3.

In some examples, the term 'terminal device' or 'user equipment' may refer to any device employed by a user to communicate. Whilst the terminal device UE of FIG. 1 is depicted as a mobile telephone, it will of course be appreciated that terminal devices may comprise various other devices, including, but not limited to laptops, smartwatches, tablet computers and vehicle-based terminal devices, such as those mounted on cars, buses, uncrewed aerial vehicles (UAVs), aeroplanes, trains, or boats. Alternatively, mobile terminal devices may be carried by a user, or worn on their person.

In FIG. 1, the terminal device UE is located at a first position P1 and is simultaneously connected to the primary cell (PCell) of the master cell group MCG and the primary cell (PSCell) of the first secondary cell group SCG1. In MR-DC, the Master Node MN with which the master cell group MCG is associated is the radio access node that provides the control plane connection to the core network. The master node MN is the node to which the terminal device first connects. The terminal device UE then subsequently connects to the secondary node using signalling messages via the master MN. The secondary node, in this case SN1, with which the secondary cell group is associated, is a radio access node that provides additional resources to the terminal device but has no control plane connection to the core network. As will of course be appreciated, a given radio access node may act as a secondary node for one terminal device, but as a master node for another terminal device. Furthermore, the given radio access node may assume these different roles for respective terminal devices concurrently.

The master node MN may be, for instance, a Master eNB (in E-UTRA-NR Dual Connectivity, EN-DC), a Master ng-eNB (in NG-RAN E-UTRA-NR Dual Connectivity) or a Master gNB (in NR-NR Dual Connectivity, NR-DC, and NR-E-UTRA Dual Connectivity, NE-DC). The secondary nodes SCG1, SCG2, SCG3 may be an en-gNB (in EN-DC), a Secondary ng-eNB (in NE-DC) or a Secondary gNB (in NR-DC and NGEN-DC).

In MR-DC, QoS flows (which carry user plane data) belonging to the same PDU session may be mapped to one or more different bearer types. These are: master cell group (MCG) bearer, secondary cell group (SCG) bearer and split bearer. An MCG bearer is a radio bearer with one or more RLC bearers only in the master cell group. An SCG bearer is a radio bearer with one or more RLC bearers only in the secondary cell group. A split bearer is a radio bearer with one or more RLC bearers in the master cell group and one or more RLC bearers in the secondary cell group. Put in other terms, for MCG bearers only the radio resources of MCG are involved, whereas for SCG bearers only the SCG radio resources are involved. In the case of split bearers, both MCG and SCG radio resources are involved. The split bearer can be used for duplication or load balancing between RAN nodes. For duplication, the use case is to provide high reliability or low interruption time for a particular service.

Figure 4:
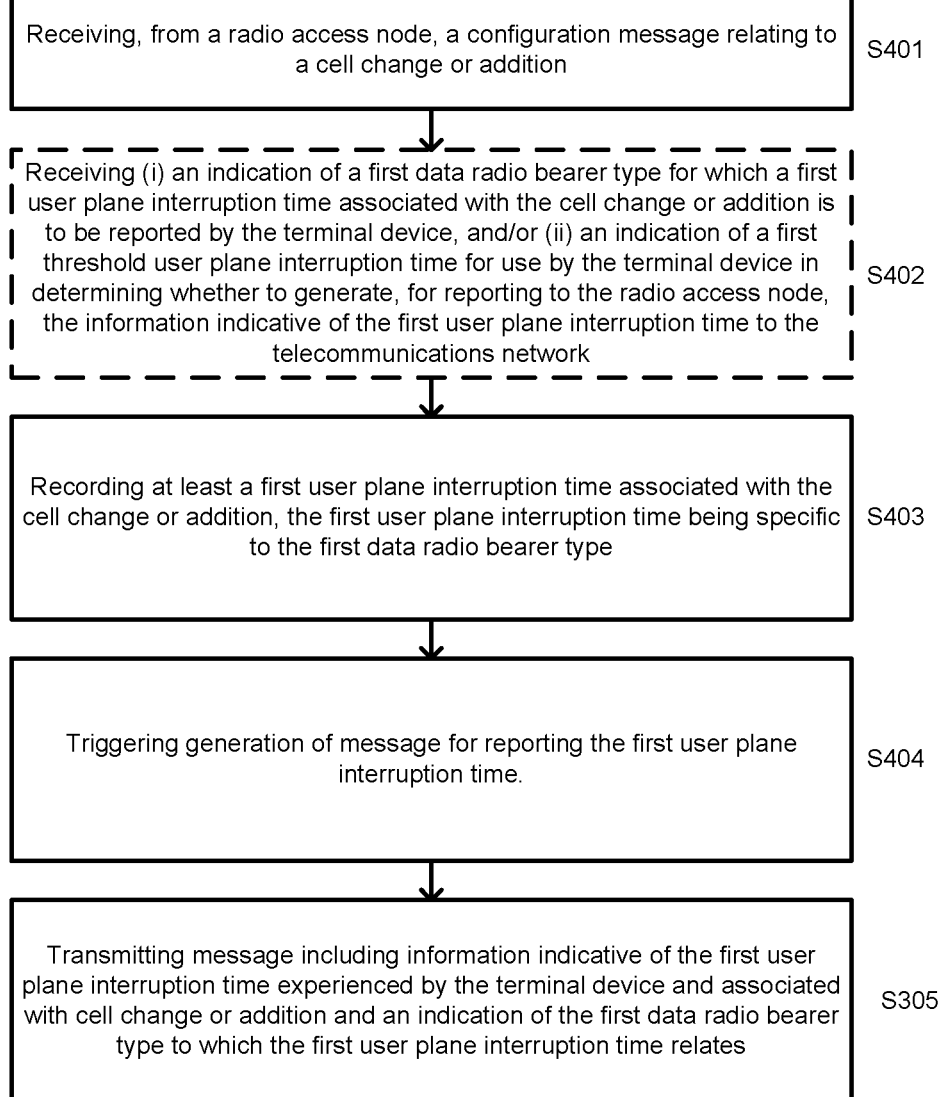

From a core network perspective, each bearer (MCG, SCG and split bearer) can be terminated either in the master node MN and or in the secondary node SN. As explained in Section 4.3.2 of 3GPP TS 37.340 if a bearer is master node MN-terminated that indicates that the user plane connection to the core network entity is terminated in the Master Node (i.e., PDCP layer is in MN), whereas for Secondary Node SN-terminated bearers, the user plane connection to the core network is terminated in the Secondary Node (i.e., PDCP layer is in SN) as depicted in Fig. 4.2.2-3 of 3GPP TS 37.340 for MR-DC with EPC and Fig. 4.2.2-4 of 3GPP TS 37.340 for MR-DC with 5G. Use of master node or secondary node terminated bearers may be related to processing capability of RAN nodes. If the master node or secondary node is loaded, either one of the RAN nodes can take the processing load.

For split bearers, MN terminated SCG bearers and SN terminated MCG bearers, PDCP PDU is transferred between the MN and SN via the MN-SN user plane interface.

In mobility situations, the terminal device UE can be transferred or handed over between the primary cells PSCell of different secondary nodes. This is known as a PSCell change. For instance, if the terminal device UE were to move from the first position P1 to a second position P2, the communication link of the terminal device may be transferred, in part by way of signalling messages from the master node, to the primary cell of the second secondary node SN2. When there is a transfer between PSCells (or an addition of a PSCell), there is a temporary interruption in the receipt of user plane data. A duration of this temporary interruption may be referred to as the "user plane interruption time".

Both the master node MN and the secondary node SN can be responsible for PSCell changes. For instance, 3GPP TS 37.340 describes master node MN-initiated secondary node change (a PSCell change) and secondary node SN-initiated change with/without master node MN involvement. In addition, the secondary node can change the Primary Secondary Cell PSCell of the terminal device UE without notifying the master node (intra-SN PSCell change without master node involvement) using a dedicated signalling radio bearer between Secondary Node and the UE (SRB3), in case of EN-DC, NGEN-DC and NR-DC. In that scenario, the master node is not aware of the PSCell change, although it still knows the correct secondary node to which the terminal device UE is connected.

Prior to a cell change, the network may configure the bearers for the connection between the UE and the target cell. This may involve selecting which bearer types to use, and/or whether or not to change the bearer termination point, e.g. from SN-terminated to MN-terminated.

Once a communication link involving a terminal device has been transferred from a source serving cell to a target serving cell, a message relating to the transfer may be transmitted by the terminal device to the network. For instance, in the example of FIG. 1, once the terminal device has been handed off from the PSCell associated with the first secondary node SN1 to the PSCell associated with the second secondary node SN2, a report (which may be referred to as a "Successful PSCell Change Report" (SPR)) may be transmitted to the master node MN. Such a report may also be sent when a PSCell is added. An addition may occur for instance when a terminal device UE initially has a connection with the master node MN only and it is then decided to add a second connection with a secondary node SN such that, after the addition, the UE has a dual connection with the master node MN and the added secondary node SN. A PSCell addition may also refer to a PSCell (primary cell of a secondary node) change that occurs after a PCell (primary cell of a master node) change.

The technology and methods described in this specification relate to such messages that may be transmitted by the UE after a change or addition of a serving telecommunication network cell.

Many of the examples described herein relate particularly to transmission of such messages after a change or addition of a PSCell in a dual connectivity scenario.

As will be appreciated from the following discussion, implementations of the described technology may enable the network (e.g. the master or secondary nodes) to improve the service provided to terminal devices in dual connectivity scenarios. More specifically, the network may be able to make better decisions when configuring PSCell changes or additions (e.g. when selecting the bearer types and/or determining whether or not to perform bearer remapping). Such improved decisions may result in shorter user plane interruptions due to PSCell changes or additions, and may allow the network to provide shorter interruption times for more critical applications.

According to examples described herein, terminal devices UE are configured to transmit a message relating to a change or addition of a telecommunication network cell which serves the UE (e.g. a PSCell in a dual connectivity scenario). The message, which may be sent from the terminal device to the master node, includes information indicative of a first user plane interruption time associated with the change or addition and an indication of a first data radio bearer type to which the first user plane interruption time relates. In some examples, the message may include information indicative of a respective user plane interruption time for each of plural different bearer types. More specifically, the message may include a respective interruption time associated with one or any combination of a secondary cell group bearer, a master cell group bearer and a split bearer. Put in other terms, the terminal device UE may be configured so as to record and report user plane interruption time on a cell group bearer type granularity.

The user plane interruption time associated with a particular bearer type may be a time elapsed between a) either receipt of a command to change or add the serving telecommunications network cell or receipt of a last user plane data packet prior to the change or addition of the serving telecommunications network cell and b) a first non-duplicated user plane data packet received at the terminal device, via a data radio bearer of the particular data radio bearer type, after the change or addition of the serving telecommunications network cell. When the serving telecommunications network cell was changed, the last user plane data packet prior to the change may have been received from the serving telecommunications network cell from which the change occurred (i.e. the source cell). When the serving telecommunications network cell was added, the last user plane data packet prior to the addition may have been received from a master cell with which the terminal device also has a connection.

The obtained interruption time with bearer type granularity can be utilized, e.g., by a mobility robustness optimization (MRO) algorithm, such that the network (e.g. the master node or the secondary node) can decide which cells to choose or prepare for future changes/additions. In addition, or alternatively, the information may be used to determine the bearer configuration for future cell changes/additions. For instance, it may be used to determine the bearer type and/or whether or not to change the bearer termination points, e.g. from SN-terminated to MN-terminated during cell change/addition. Such determinations may be made by, or put another way the interruption time information may be used by the secondary node, e.g. in the SN-initiated PSCell changes, or the master node, e.g. in MN-initiated PSCell changes/additions.

In some examples, a radio access node of the network (e.g. the master node MN), may transmit to the terminal device an indication of the particular bearer type(s) for which user plane interruption time(s) is/are to be reported by the terminal device UE. In this way, the terminal device may avoid unnecessary activity (and so save energy) associated with measuring the user plane interruption time for every possible bearer type. For instance, the radio access node may indicate which bearer types should and/or which should not, have their interruption times reported.

In addition, or alternatively, the network may configure the terminal device with one or more threshold user plane interruption times for use in determining whether and when to generate a report message which includes the interruption time(s). This may ensure the prompt reporting of the interruption time responsive to the user plane interruption time on the particular bearer type exceeding the threshold. For instance, detection of the user plane interruption time for a particular bearer type exceeding the threshold may trigger the generation of a message including information indicative of the interruption time. In such examples, after the threshold is exceeded, the terminal device may wait until the interruption time (or all interruption times of interest) is determined (i.e. because the first packet is received via the particular bearer type) to generate the message. Alternatively, the terminal device may generate the message immediately with an indication that the interruption time has exceeded the threshold (rather than the actual interruption time). In some examples, the terminal device may report only the interruption time(s) which exceed the threshold, thereby saving energy at the terminal device UE. In some examples, different thresholds may be assigned for different bearer types. Once the message has been generated by the terminal device UE, the terminal device may indicate the availability of the message to the network (e.g. the master node). The network (e.g. the master node) may then decide to fetch the message by requesting it from the terminal device UE. In response to such a request, the terminal device may transmit the message to the master node MN. This may be referred to as a retrieval process.

The setting of the thresholds of user plane interruption time(s) on a specific bearer type may depend on the service or application that the UE uses on the specific bearer type and/or may depend on previous user plane interruption times experienced. For instance, for a particular service or application with a low latency requirement, a given threshold may be set so as to correspond to a lower duration than for a service or application without such a stringent requirement. Previous user plane interruption time(s) may inform the duration of the threshold, for instance such that the generation of the report is triggered if the interruption time is longer than an interruption time that is expected based on the previous user plane interruption times.

The interruption time threshold(s) may be conveyed to the terminal devices UE in a message from the master node. This may or may not be the same message as that which conveys the indication of the specific bearer type interruption times that are to be measured. In situations in which the master node does not know the acceptable interruption threshold(s) for a given bearer type (e.g. for SN-terminated SCG bearer), the interruption threshold may be delivered to the master node from the secondary node that operates the target PSCell of the cell change or addition (e.g. in operation S206 of FIG. 2, discussed below).

Figure 2:
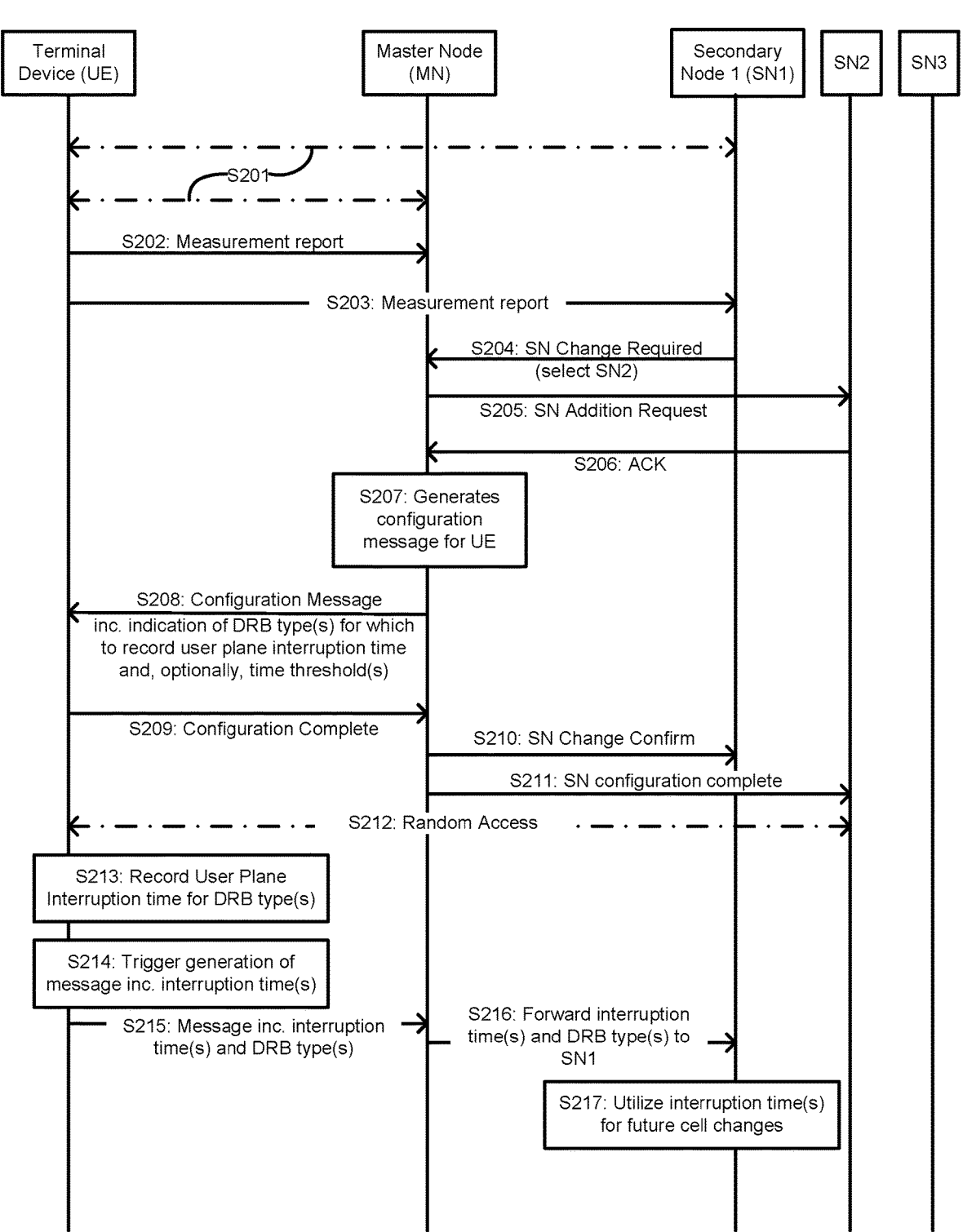
FIGS. 2 and 3 are example message flow sequences.
Figure 3:
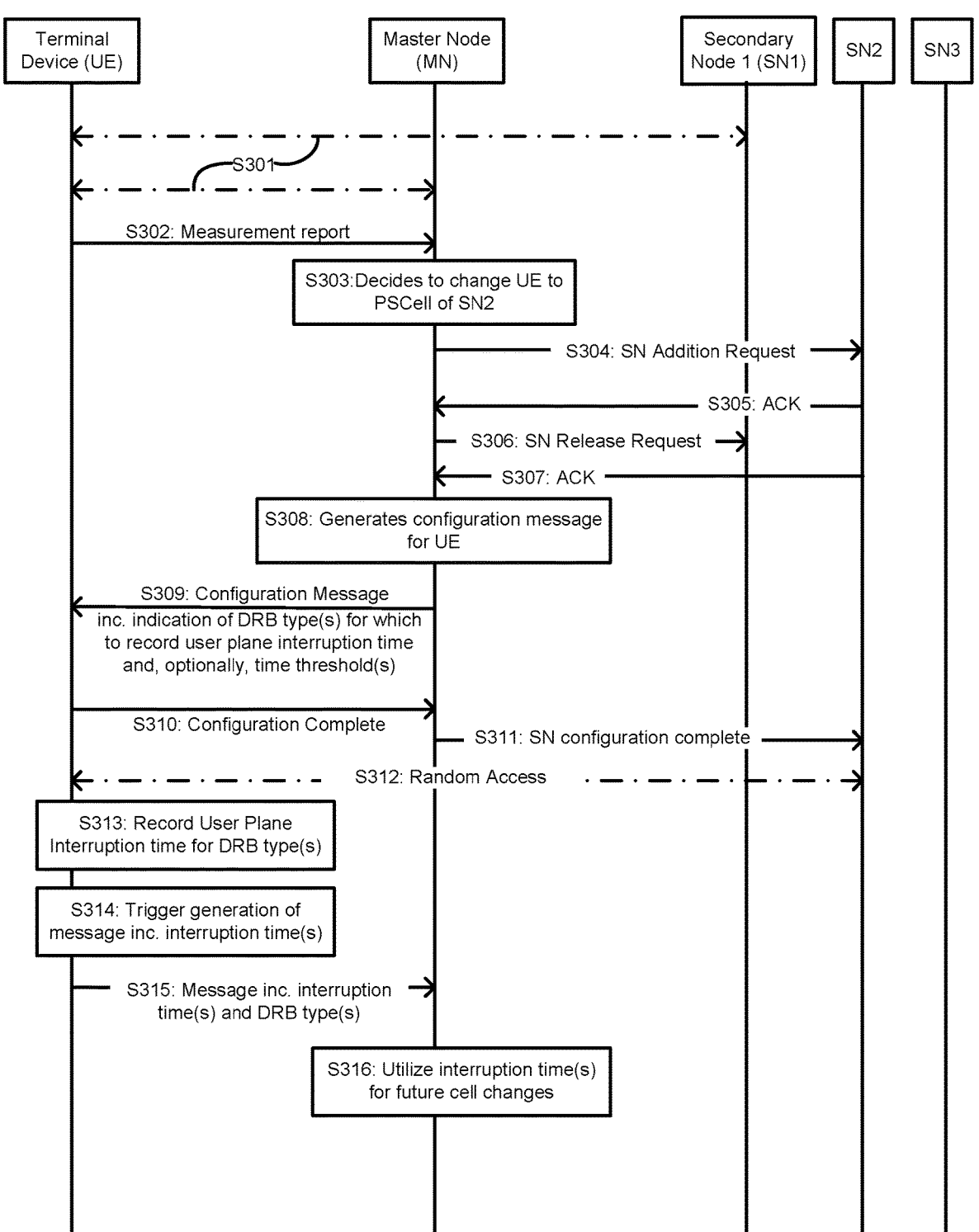

FIGS. 2 and 3 illustrate various examples relating to the reporting of bearer-type-specific user plane interruption times in a PSCell change context. Whilst FIGS. 2 and 3 relate to a PSCell change context, it should be appreciated that the concepts and approaches described herein apply also in a PSCell addition context for master node MN-initiated PSCell addition(s). In addition, although in the examples of FIGS. 2 and 3 the master node MN is involved in coordinating the cell changes, the concepts and approaches described herein may apply also to SN-initiated changes without master node MN involvement.

The example of FIG. 2 depicts reporting of bearer-type-specific user plane interruption times in a secondary node SN-initiated PSCell change context. As in FIG. 1, FIG. 2 illustrates the terminal device UE, the master node MN, the first secondary node SN1, the second secondary node SN2 and the third secondary node SN3.

In operation S201, the terminal device UE is connected in dual connectivity to the PCell of the master node and the PSCell of the first secondary node SN1.

In operations S202 and S203, the terminal device is sending radio measurement reports to the master node MN and the first secondary node SN1. Such reports enable the respective nodes to determine when cell changes should be initiated.

In operation S204, the first secondary node SN1 decides, based on the received measurement reports, that a PSCell change should be performed. As can be understood from the above discussion, PSCell involves the terminal device being handed off from the primary cell operated by SN1 to a primary cell operated by another secondary node. Accordingly, the first secondary node SN1 transmits a 'change required' message to the master node. In this case, the first secondary node SN1 identifies the second secondary node SN2 as the target node of the PSCell change (and so the PSCell of SN2 is the target cell). As such, the change required message suggests that the terminal device should be handed over to a primary cell of the second secondary node SN2.

In operation S205, the master node sends a secondary node addition request message to the secondary node suggested by the first secondary node SN1. Accordingly, in this example, the secondary node addition request message is sent to the target secondary node SN2. The request message includes a request for the target secondary node SN2 to allocate resources for the terminal device UE. The request may also identify potential data radio bearers to be used in the connection between the terminal device and the target secondary node SN2.

In operation S206, the target secondary node SN2 replies to the master node MN with an acknowledgement message. The acknowledgment message (an addition request acknowledgment message) accepts the configuration of data radio bearers requested by the master node.

In some implementations, the target secondary node SN2 might also provide an indication to the master node MN of one or more interruption time thresholds for use by the terminal device UE in determining whether or when to log and report interruption times for specific bearer types. As noted above, the duration of the user plane interruption time thresholds may depend on the service or application that the UE uses on the specific bearer type and/or may also depend on previous user plane interruption times experienced. The threshold interruption time(s) may be included in the acknowledgment message provided in S206, or may be included in a separate message.

The target secondary node SN2 may indicate a threshold interruption time for each different bearer type. The threshold interruption time for each different bearer type may or may not be different from one another. For instance, all indicated threshold interruption times may be different or two may be the same and one may be different. In some examples, interruption times may only be indicated for those bearer types that are to be used by the target secondary cell with the terminal device UE. For instance, if split bearers are not going to be used, a threshold interruption time associated with split bearers may not be indicated.

In other implementations in which threshold interruption times are utilised, these may be determined by the master node and so may not be indicated by the target secondary node (in the acknowledgment message of S206 or otherwise).

In operation S207, the MN generates a configuration message for the terminal device. The configuration message indicates the configuration of data radio bearers that is to be used during dual connectivity following the cell change. For instance, the configuration message may indicate any one or any combination of SCG bearers, MCG bearers or split bearers, and may indicate the termination point for each of those bearers, i.e. MN-terminated or SN-terminated bearers. The configuration message may be an RRC reconfiguration message.

In addition, the master node may also generate information for configuring the terminal device UE to report the user plane interruption time(s) associated with the cell change for one or more specific bearer type(s).

In some examples, the generated information indicates the bearer-type-specific user plane interruption times that should be measured. For instance, it may indicate that the terminal device should measure and report any one or any combination of an SCG bearer specific user plane interruption time, an MCG bearer-specific user plane interruption time or a split bearer specific user plane interruption time. In some examples, the indicated interruption time(s) may correspond to the bearer types that are to be used for dual connectivity after the cell change. In other examples, the information may indicate that only a subset of the bearer types that are to be used for dual connectivity after the cell change should be logged and reported. The subset of bearer types may be only those in which the master node MN is interested, for instance those that are currently being used in serving the terminal device UE or those that the master node plans to use for serving the terminal device UE in dual connectivity in the future. By requiring the terminal device UE to log and report interruption times for only a subset of bearers, the terminal device UE may save energy associated with such logging and reporting.

The information may explicitly indicate the bearer-type-specific user plane interruption times that are to be reported and/or the bearer-type-specific user plane interruption times that are not to be reported. If it is explicitly indicated that a particular bearer-type-specific user plane interruption time is to be reported, but other bearer-type-specific user plane interruption times are not indicated, the terminal device may infer that the other bearer-type-specific user plane interruption times are not to be reported. Conversely, in other examples, if it is explicitly indicated that a particular bearer-type-specific user plane interruption time is not to be reported, but other bearer-type-specific user plane interruption times are not indicated, the terminal device may infer that the other bearer-type-specific user plane interruption times are to be reported. In yet other examples, the information message may explicitly indicate which bearer-type-specific user plane interruptions times are to be reported and which are not. For instance, the information may include a True or False flag for each bearer type, which indicates whether or not the interruption time for that bearer type should be reported.

The information for configuring the terminal device UE to report the user plane interruption time associated with the cell change for one or more specific bearer type(s) is transmitted to the terminal device in a configuration message, for instance the configuration message (e.g. the RRC reconfiguration message) which indicates the configuration of data radio bearers that is to be used during dual connectivity following the cell change.

In some examples, the master node may generate information indicating one or more user plane threshold interruption times. The information indicating one or more user plane threshold interruption times may be sent to the terminal device in the same message as the information for configuring the terminal device UE to report the user plane interruption time associated with the cell change for one or more specific bearer type(s). As discussed above, the thresholds interruption times may have been received from the target secondary node SN2, e.g. in operation S206, or may have been determined by the master node MN. The configuration message may indicate a respective threshold interruption time (which may or may not be different) for each of the different bearer-type specific user plane interruption times that are to be reported by the terminal device UE. Alternatively, one threshold interruption time may be indicated for multiple bearer-type-specific user plane interruption times.

In some examples, the master node MN may be capable of selectively configuring terminal devices UEs to report bearer-type-specific user plane interruption times. Put another way, the master node MN may configure some terminal devices UEs to report user plane interruption times with a bearer-specific granularity, but not other terminal devices UEs such that those other terminal devices do not report user plane interruption times with a bearer-specific granularity (although they may still report the user plane interruption time, just not with a bearer-specific granularity). For instance, for those other terminal devices, the master node may omit, from the configuration message, the information for configuring the terminal device UE to report the user plane interruption time(s) associated with the cell change for one or more specific bearer types. In some examples, the decision as to whether or not to configure a terminal device UE to report user plane interruption times with bearer-specific granularity may be based on one or more applications running at the terminal device UE. As such, terminal devices running application(s) for which a lower user plane interruption time is more critical may be configured by the master node MN to report bearer-type-specific user plane interruption time(s), whereas other terminal devices which are not running such applications may not be configured in this way.

In operation S208, one or more configuration messages may be sent to the terminal device for configuring the cell change. For instance, a single configuration message may be sent which indicates the configuration of data radio bearers that are to be used during dual connectivity following the cell change and the information for configuring the terminal device UE to report the user plane interruption time associated with the cell change for one or more specific bearer type(s). In some examples, the message may additionally include information indicating one or more user plane threshold interruption times, as discussed above.

In operation S209, the UE applies the configuration indicated in the message(s) of operation S208, and sends to the master node a message indicating that the configuration is complete. This may be an RRCReconfigurationComplete message.

In operation of S210 and upon successful configuration of resources by the master node MN, the master node MN confirms the cell change with the source secondary node SN1 and the release of the source secondary node SN1's resources.

In operation S211, the master node MN notifies the target secondary node SN2 about the completion of configuration of the cell change.

In operation S212, the terminal device performs random access procedure towards the target cell of the target secondary node SN2.

In operation S213, the terminal device measures one or more bearer-type-specific user plane interruption times. For instance, it may measure the interruption times for the bearer types indicated in the configuration message(s) described with reference to operations S208 and S209. In other examples, the terminal device may be pre-configured by the master node MN, or in some other way, to measure user plane interruption times on a specific user plane basis. Put another way, the configuration message(s) received in S208 may not indicate the bearer-type-specific user plane inter-ruption times to be measured or that the terminal device should measure interruption times on a specific-bearer type basis, yet the terminal device may still do so. For instance, it may have hard coded to do so, or may have been instructed to do so in an earlier communication with the master node or another node of the network.

To measure the bearer-type specific user plane interrup-tion times, the terminal device may have a timer for each bearer-type specific user plane interruption time that is to be measured. The timers may be started as soon as the UE receives the reconfiguration message in operation S208 (e.g. the RRC configuration message) or when the last user plane data packet (PDCP PDU) is received from the source cell on any bearer type. The timer then may be stopped as soon as the first non-duplicated user plane data packet (PDCP PDU) is received from the target cell on the specific bearer type to which the timer relates. For instance, if an MCG bearer timer and an SCG bearer timer are running, the MCG bearer timer is stopped when the first non-duplicated user plane data packet is received on an MCG bearer and the SCG bearer timer is stopped when the first non-duplicated user plane data packet is received on an SCG bearer. Similarly, a split bearer timer is stopped when the first non-duplicated user plane data packet is received on a split bearer. The values of the timers may be logged for reporting to the network.

As noted above, when the interruption time is measured based on the time of reception of the last-received user plane data packet, this packet may be received on any bearer. As such, the MCG-bearer-specific interruption time may be measured in any of the following cell change scenarios: 1) source MCG bearer is mapped to target MCG bearer, 2) source SCG bearer is mapped to target MCG bearer, and 3) source split bearer is mapped to target MCG bearer.

Similarly, the SCG-bearer-specific interruption time may be measured in any of these cell change scenarios: 4) source MCG bearer is mapped to target SCG bearer, 5) source SCG bearer is mapped to target SCG bearer, and 6) source split bearer is mapped to target SCG bearer. Finally, the split bearer-specific interruption time may be measured in any of these cell change scenarios: 7) source MCG bearer is mapped to target split bearer, 8) source SCG bearer is mapped to target split bearer, and 9) source split bearer is mapped to target split bearer.

Although, in many of the embodiments described herein, the interruption time is measured based on receipt of packets in the PDCP layer, it will of course be appreciated that a different layer may instead be utilised to determine the interruption time. For instance, the interruption time may be determined based on receipt of radio link control (RLC) layer packets.

In operation S214, the terminal device UE triggers the generation of a message which includes information indica-tive of a one or more bearer-type-specific user plane inter-ruption times and an indication of the data radio bearer type(s) to which the bearer-type-specific user plane inter-ruption time(s) relate. For instance, the information may include one or more of an MCG bearer interruption time, an SCG bearer interruption time, and a split bearer interruption time.

The information may be included as part of a Successful PSCell change/addition report (SPR) message. In addition, the message may include other information such as some or any combination of the following:

Source and target cell IDs of the PSCell change,

Location information,

Latest radio link measurements of all measurement IDs available at the time PSCell change is executed, An indication of a cause that was the trigger for gener-ating the message, Latest radio measurement results of the candidate target cells, in case of conditional PSCell change (CPC), Time elapsed between conditional PSCell change execu-tion towards target cell and corresponding latest con-figuration received for the selected target cell, Cell Radio Network Temporary Identifier of target PSCell, RA-InformationCommon when T304 (see below) is above a threshold.

In implementations in which threshold user plane inter-ruption times are not used, the trigger for the generation of the message in operation S214, may be based on trigger conditions (e.g. percentage thresholds) associated with existing timers such as T304/T310/T312 as defined in TS 38.331. Thus, once such trigger conditions are satisfied, the measured user plane interruption times may be reported to the network. In such implementations, it is not necessary for the terminal device UE to implement new timers in addition to those already implemented.

In other implementations, and as discussed above, the trigger for the generation of the message in operation S214 may be based on one or more threshold user plane data interruption times. The terminal device UE may be precon-figured with such a threshold, or, as discussed above, the threshold interruption time(s) may be received from the network (e.g. the master node MN, or the target secondary node SN2 via the master node). There may be a single threshold interruption time for all bearer types, such that a report including the measured interruption times is gener-ated when any one of the bearer-type specific user plane interruption times exceeds the threshold. Alternatively, each measured bearer-type-specific user plane interruption time may have its own threshold, and the measured interruption time may be reported to the network only if its threshold time is exceeded. The terminal device may wait for each of the timer(s) to be stopped (or to expire) before reporting the measured interruption times in a single message.

By utilising a threshold user plane data interruption time, e.g. rather than one of the pre-existing timers, information indicative of the user plane interruption times may be transmitted to the network more often (for instance, in a situation where an interruption time for a particular bearer type is high, but one of the pre-existing trigger conditions is not satisfied). This may allow the network to make better bearer configuration decisions.

In operation S215, the message (e.g. the SPR message) which includes information indicative of a one or more bearer-type-specific user plane interruption times and an indication of the data radio bearer type(s) to which the bearer-type-specific user plane interruption time(s) relate is transmitted by the terminal device UE to the master node MN. As mentioned above, such transmission of the message may be part of a retrieval process whereby, once the message is generated in S214 (e.g. because a threshold interruption time has been exceeded), the terminal device UE notifies the master node MN that the message is available. The master node MN may then respond to the notification by requesting the terminal device to transmit the message. In response to such a request, the terminal device may then transmit the message.

In operation S216, the master node detects that the received (SPR) message is intended for the source secondary node SN1 and sends it to the source secondary node SN1 for analysis and use. For instance, the message may be forwarded using an access and mobility indication message. For SN-initiated cell changes, it might occur that the master node and secondary nodes are of different radio access technologies and so the master node might not be able to understand the measurement information generated for secondary node and so the message is forwarded to the source secondary node SN1.

In operation S217, the source secondary node SN1, having received the message forwarded in operation S216 utilizes the information, including the bearer-type-specific user plane interruptions times, for determining future SN-initiated cell changes.

For instance, when the source secondary node SN1 is requesting or causing a cell change in the future (e.g. by sending a change request message to the master node MN), it may utilise the previously received bearer-type-specific user plane data interruption times to identify the target secondary node. For instance, the previously-received information may allow the secondary node SN1 to determine that a change to a cell operated by SN2 may cause a user plane interruption time that violates certain criteria for a specific terminal device UE.

In another example, when the source secondary node SN1 is requesting a cell change in the future, it may, when suggesting SN2 as the target and based on the previously-received bearer-type-specific user plane data interruption time(s), suggest to the master node MN a certain bearer configuration. In addition, or alternatively, it may suggest to the master node whether or not to perform bearer remapping (e.g. SN-terminated to MN-terminated) during cell change to avoid any potential user plane interruption time and ensure a smooth operation during PSCell change. The master node may take such suggestions into account when determining to add or change a PSCell and/or during the PSCell change/addition. Such suggestions may be included in a change request message such as is discussed in connection with operation S204.

FIG. 3 is similar to FIG. 2 but illustrates reporting and use of bearer-type-specific user plane interruption times in the context of a master node MN-initiated PSCell change context (rather than an SN-initiated PSCell context as in FIG. 2). Many of the operations in FIG. 3 are similar to those in FIG. 2 and so detailed discussion of such operations will not be repeated.

In operation S301, the terminal device UE is connected in dual connectivity to the PCell of the master node and the PSCell of the first secondary node SN1.

In operation S302, the terminal device is sending radio measurement reports to the master node MN. Such reports enable the respective nodes to determine when cell changes should be initiated.

In operation S303, the master node MN decides, based on the received measurement reports, that a PSCell change should be performed. In this case, the master node MN identifies the second secondary node SN2 as the target of the PSCell change (and so the PSCell of SN2 is the target cell).

In operation S304, the master node sends a secondary node addition request message to the secondary node identified as the target for the cell change. Accordingly, in this example, the secondary node addition request message is sent to the second secondary node SN2. The request message includes a request for the target secondary node SN2 to allocate resources for the terminal device UE. The request may also identify potential data radio bearers to be used in the connection between the terminal device and the target secondary node SN2.

In operation S305, the target secondary node SN2 replies to the master node MN with an acknowledgement message. This may be similar to as described with reference to S206. As such, as described with reference to S206, the reply may include, for instance, an indication of one more threshold user plane interruption times.

In operations S306, the master node MN may send a release request message to the source secondary node SN1 requesting the source secondary node to release the resources for the terminal device.

In operation S307, the source secondary node SN1 confirms the release of terminal device UE resources by sending the master node MN a SN Release Request Acknowledge message.

In operation S308, the master node MN generates one or more configuration message(s) for the terminal device. The configuration message(s) indicates the configuration of data radio bearers that is to be used during dual connectivity following the cell change. The configuration message(s) may be similar to as described with reference to operation S207. As such, the configuration message(s) may include information for configuring the terminal device UE to report the user plane interruption time associated with the cell change for one or more specific bearer type(s). Such information may be as described with reference to S207. In some implementations, similarly to as described with reference to S207, the configuration message(s) may include information indicating one or more user plane threshold interruption times for use by the terminal device in determining whether and/or when to log report the bearer-type-specific user plane interruption times.

In operation S309, similarly to as described with reference to S208, the configuration message(s) is/are sent to the terminal device UE.

In operation S310, similarly to as described with reference to S209, having applied the new configuration, the terminal device UE sends a configuration complete message to the master node MN.

In operation S311, similarly to S211, the master node MN notifies the target secondary node SN2 about the configuration completion of the cell change S210, the master node sends an SN Reconfiguration Complete message to SN2 to confirm the successful configuration of the UE.

In operation S312, as in operation S212, the terminal device UE performs random access procedure towards the target cell of the target secondary node SN2.

In operation S313, the terminal device measures one or more bearer-type-specific user plane interruption times. This may be as described with reference to S213.

In operation S314, the terminal device UE triggers the generation of a message which includes information indicative of a one or more bearer-type-specific user plane interruption times and an indication of the data radio bearer type(s) to which the bearer-type-specific user plane interruption time(s) relate. This may be as described with reference to S214.

In operation S315, the message generated in S314 (e.g. the SPR message) which includes information indicative of a one or more bearer-type-specific user plane interruption times and an indication of the data radio bearer type(s) to which the bearer-type-specific user plane interruption time(s) relate is transmitted by the terminal device UE to the master node MN. This may be as described with reference to S215. For instance, the transmission may be part of a retrieval process, whereby the terminal device notifies the network (e.g. the master node) regarding the availability of the message, and the network (e.g. the master node) may then decide to fetch the message by requesting it from the terminal device UE. The transmission may of the message may be responsive to such a request.

In operation S316, the master node MN utilises the information in the message of S314 to inform its decisions with regard to further PSCell changes/additions. For instance, when selecting the PSCell of SN2 as a target of the future change or addition, the MN may decide not to utilize SN-terminated bearers to avoid a substantial user plane interruption time. Alternatively, it may utilize SN-terminated bearers but may decide to remap the SN-terminated bearers to MN-terminated bearers during PSCell change/addition, so as to reduce the load on the secondary node in order to reduce user plane interruption time.

FIG. 4 is a flow chart illustrating operations which may be performed by the terminal device UE in connection with the above-described methods.

In operation S401, the terminal device receives, from a radio access node (the master node MN), a configuration message relating to a cell change or addition. This message may be as described with reference to operations S207 and S208 in FIG. 2, and S308 and S309 in FIG. 3.

In some examples, the terminal device may, as depicted in operation S402, receive (i) an indication of a first data radio bearer type for which a first user plane interruption time associated with the cell change or addition is to be reported by the terminal device, and/or (ii) an indication of a threshold user plane interruption time for use by the terminal device in determining whether to generate, for reporting to the radio access node, the information indicative of the first user plane interruption time. The information received in operation S402 may be as described with reference to FIG. 1, FIG. 2 (not least operations S207 and S208) and FIG. 3 (not least operations S308 and S309). The information may be included in the configuration message received in S401.

In operation S403, the terminal device records or measures at least the first user plane interruption time associated with the cell change or addition, the first user plane interruption time being specific to the first data radio bearer type. This may be as described with reference to operation S313 of FIG. 3 or operation S213 of FIG. 2. For instance, as described above, the terminal device may record or measure the first user plane interruption time specific to the first data radio bearer type as a result of having received the indication of a first data radio bearer type in S402. Alternatively, the terminal device may be pre-configured, in some other way, to measure or record user plane interruption times on specific bearer type basis.

In operation S404, the terminal device UE triggers preparation of a message for reporting the first user plane interruption time. The triggering may be as described with reference to S314 and S214. The triggering may, in some examples, be based on a threshold user plane interruption time which may have been received in S402 or may be pre-stored at the terminal device.

In operation S405, the terminal device transmits a message including information indicative of (at least) the first user plane interruption time experienced by the terminal device and associated with cell change or addition and an indication of the first data radio bearer type to which the first user plane interruption time relates. The message, which may be a Successful PSCell change/addition report (SPR) message, may be as described with reference to FIGS. 1, 2 and 3 (not least operations S215 and S315). This information may enable the network to make more informed decisions when determining bearer configurations for future cell changes or additions. As noted above in relation to FIGS. 1, 2 and 3, the transmission of the message may be part of a retrieval process.

FIG. 5 is a flow chart illustrating operations which may be performed by the master node MN in connection with the above-described methods.

In S501, the master node MN may transmit to a terminal device a configuration message for configuring the terminal device for a cell change, that is to change from a cell operated by a source secondary node SN1 to a cell operated by a target secondary node SN2. In some examples, the configuration message includes (i) an indication of (at least) a first data radio bearer type for which a first user plane interruption time associated with the cell change or addition is to be reported by the terminal device, and/or (ii) an indication of a threshold user plane interruption time for use by the terminal device in determining whether to generate, for reporting to the master node, the information indicative of the first user plane interruption time. In some examples, these indications may be transmitted in one or more additional configuration messages. In yet other examples, these indications may not be transmitted, for instance if the terminal device is pre-configured to report on user plane interruption times on a specific bearer type basis, and optionally also has one or more pre-stored threshold user plane interruption times. Operation S501 may be as described with reference to FIG. 1, FIG. 2 (not least S207 and S208), FIG. 3 (not least S308 and S309) and FIG. 4 (not least operations S401 and S402). As described with reference to FIGS. 2 and 3, in some examples, the threshold user plane interruption time may have been received at the master node MN from the target secondary node SN2.

In S502, the master node MN may, after the cell change or addition has been completed, receive from the terminal device a message including information indicative of (at least) the first user plane interruption time experienced by the terminal device and associated with the cell change or addition and an indication of the first data radio bearer type to which the first user plane interruption time relates. Operation S502 may be as described with reference to FIG. 1, FIG. 2 (not least S213 to S215), FIG. 3 (not least S313 and S315) and FIG. 4 (not least operations S405). As noted above in relation to FIGS. 1, 2, 3, and 4, the reception of the message by the master node MN may be part of a retrieval process.

Next, either of operations S503 and 505 may be performed depending on whether the cell change or addition was MN-initiated or the cell change was SN-initiated. If the cell change or addition was MN-initiated, operation S505 may be performed. In operation S505, the master node MN utilises the received information indicative of the bearer-type-specific user plane interruption time to determine bearer configuration for future cell changes or additions. S505 may be as described, for instance, with reference to S316 of FIG. 3.

If the cell change was SN-initiated, operation S503 may be performed. In operation S503, the master node forwards the message to the source secondary node SN1. This may as described with reference to S216 of FIG. 2. Subsequently, in operation S217, and in connection with a future cell change (e.g. in which the first secondary node SN1 is once again the source secondary node), the master node may receive, from source secondary node, and in connection with future cell changes, information indicative of suggested bearer configurations. Such suggested bearer configurations may have been determined using the information indicative of the specific-bearer-type interruption time(s) that was previously forwarded to the secondary node. Operation S504 may be as described with reference to FIGS. 1 and 2 above, not least S217 of FIG. 2.

FIG. 6 is a flow chart illustrating operations which may be performed by a source secondary node SN1 in connection with the above-described methods.

In operation S601, the source secondary node SN1 receives from the master node MN information indicative of (at least) a first user plane interruption time, experienced by the terminal device and associated with a completed cell change, and an indication of a first data radio bearer type to which the first user plane interruption time relates. This may be as described with reference to FIGS. 1, 2 (not least S216) and 5 (not least S503).

In operation S602, the secondary node SN1 utilises the received information indicative of the first user plane interruption time to determine a bearer configuration for a not-yet-performed cell change. This may occur following a determination, based on measurements from the terminal device, that a PSCell is required. Operation S602 may be as described with reference to FIGS. 1, 2 (not least S217).

In operation S603, the secondary node SN1 transmits, to the master node MN, information indicative of a determined bearer configuration for the not-yet-performed cell change. Operation S603 may be as described with reference to FIGS. 1, 2 (not least S217).

Figure 7:
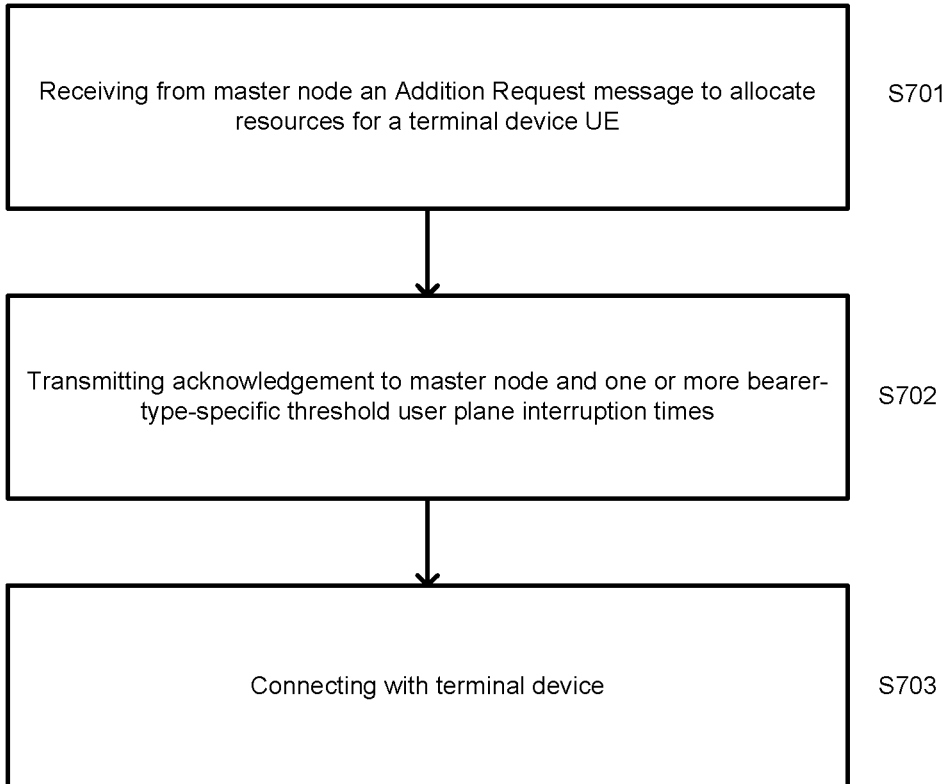

FIG. 7 is a flow chart illustrating operations which may be performed by a target secondary node SN2 in connection with the above-described methods.

In operation S701, the target secondary node SN2 receives from the master node MN an 'addition request' message to allocate resources for a terminal device UE. This may be as described with reference to S205 of FIGS. 2 and S304 of FIG. 3.

In operation S702, the target secondary node SN2 transmits an acknowledgement to the master node MN. This may be as described with reference to operation S206 of FIGS. 2 and S307 of FIG. 3. As mentioned herein, in some examples, the acknowledgment may include one or more bearer-type-specific threshold user plane interruption times. Use of such threshold user plane interruption times is described in connection with, for instance, S214 of FIGS. 2 and S314 of FIG. 3 respectively.

Subsequently, in operation S703, the target secondary node SN2 establishes a connection with the terminal device, e.g. by way of a random access procedure such as in S212 of FIGS. 2 and S312 of FIG. 3.

Example Configurations of Apparatuses

Figures 8, 9, 10:
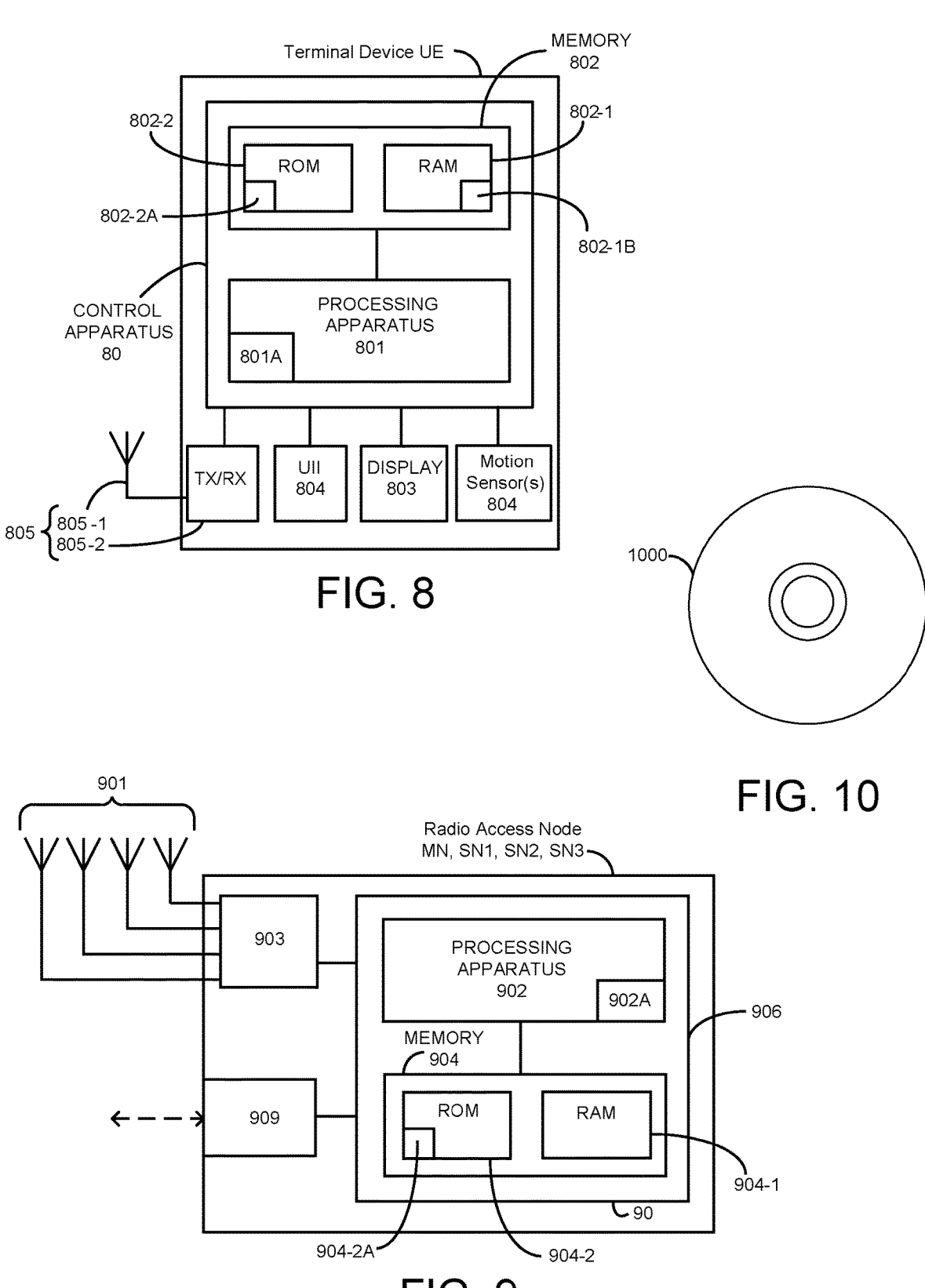
FIG. 8 is a schematic illustration of an example configuration of a terminal device which may be configured to perform various operations described with reference to FIGS. 1 to 7.
FIG. 9 is a schematic illustration of an example configuration of a radio access node which may be configured to perform various operations described with reference to FIGS. 1 to 7.
FIG. 10 is an illustration of a computer-readable medium upon which computer readable code may be stored.

FIG. 8 is a schematic illustration of an example configuration of a terminal device UE which may be configured to perform various operations described with reference to FIGS. 1 to 7.

The terminal device UE may communicate, e.g. with a radio access node MN, SN1, SN2 of a telecommunications network, via an appropriate radio interface arrangement 805. The interface arrangement 805 may be provided for example by means of a radio part 805-2 (e.g. a transceiver) and an associated antenna arrangement 805-1. The antenna arrangement 805-1 may be arranged internally or externally to the terminal device UE.

The terminal device UE comprises a controller/control (or processing) apparatus 80 which is operable to control the other components of the terminal device UE in addition to performing any suitable combinations of the operations described in connection with terminal device UE with reference to the preceding Figs. The control apparatus 80 may comprise processing apparatus 801 and memory 802. Computer-readable code 802-2A may be stored on the memory 802, which when executed by the processing apparatus 801, causes the control apparatus 80 to perform any of the operations described herein in relation to the terminal device UE. Also, the memory 802 may include a transmission buffer 802-1B.

Example configurations of the memory 802 and processing apparatus 801 will be discussed in more detail below The terminal device UE may be, for example, a device that does not need human interaction, such as an entity that is involved in Machine Type Communications (MTC). Alternatively, the terminal device UE may be a device designed for tasks involving human interaction such as making and receiving phone calls between users and streaming multimedia or providing other digital content to a user. Non-limiting examples for the terminal device UE include a smart phone, a laptop, a smartwatch, a tablet computer, an e-reader, a vehicle-based terminal device, such as those mounted on cars, buses, uncrewed aerial vehicles (UAVs), aeroplanes, trains, or boats, or any type of terminal device that may be carried by a user, or worn on their person.

Where the terminal device UE is a device designed for human interaction, the user may control the operation of the terminal device UE by means of a suitable user input interface UII 804 such as key pad, voice commands, touch sensitive screen or pad, combinations thereof or the like. A display 803, a speaker and a microphone may also be provided. Furthermore, the terminal device UE may comprise appropriate connectors (either wired or wireless) to other devices and/or for connecting external accessories, for example hands-free equipment, thereto. The terminal device UE may additionally be associated with (e.g. comprises or is in short range wired or wireless communication with) one or a plurality of motion sensors 804 for sensing motion of the mobile device. The terminal device may additionally include other sensors such as a GNNS unit.

FIG. 9 is a schematic illustration of an example configuration of a radio access node, for instance any one of the master node MN or the first to third secondary nodes SN1 to SN3 as described herein. The radio access node MN, SN1, SN2, SN3 is configured for communicating with the terminal device UE via a wireless interface. The radio access node MN, SN1, SN2, SN3 comprises a radio frequency antenna array 901 configured to receive and transmit radio frequency signals. Although the radio access node MN, SN1, SN2, SN3 is shown as having an array 901 of four antennas, this is illustrative only. The number of antennas may vary, for instance, from one to many hundreds. The radio access node is capable of operating at least a primary cell (PCell or PSCell) and may also operate one or more secondary cells (SCell).

The radio access node MN, SN1, SN2, SN3 further comprises radio frequency interface circuitry 903 configured to interface between the antenna 901 and a control apparatus 90. The radio frequency interface circuitry 903 may also be known as a transceiver. The radio access node MN, SN1, SN2, SN3 also comprises one or more interfaces 909 via which it can communicate (e.g. via X2 messages) with other the radio access nodes MN, SN1, SN2, SN3 and other network entities such as those of the core network.

The radio access node (RAN) control apparatus 90 may be configured to process signals from the radio frequency interface circuitry 903, control the radio frequency interface circuitry 903 to generate suitable RF signals to communicate information to the UEs 40 via the wireless communications link, and also to exchange information with other network elements via the interface 909.

The RAN control apparatus 90 may comprise processing apparatus 902 and memory 904. Computer-readable code 904-2A may be stored on the memory 904, which when executed by the processing apparatus 902, causes the control apparatus 90 to perform any of the operations assigned to the radio access nodes MN, SN1, SN2, SN3 described above.

As should of course be appreciated, the entities UE, MN, SN1, SN2, SN3 shown in each of FIGS. 8 and 9 described above may comprise further elements which are not directly involved with processes and operations in respect which this application is focused.

Some further details of components and features of the above-described apparatus/entities/apparatuses UE, MN, SN1, SN2, SN3 and alternatives for them will now be described.

The control apparatuses 80, 90 may comprise processing apparatus 801, 902 communicatively coupled with memory 802, 904. The memory 802, 904 has computer readable instructions 802-2A, 904-2A stored thereon, which when executed by the processing apparatus 801, 902 causes the control apparatus 80, 90 to cause performance of various ones of the operations described herein. The control apparatus 80, 90 may in some instances be referred to, in general terms, as "apparatus".

The processing apparatus 801, 902 may be of any suitable composition and may include one or more processors 801A, 902A of any suitable type or suitable combination of types. For example, the processing apparatus 801, 902 may be a programmable processor that interprets computer program instructions 802-2A, 904-2A and processes data. The processing apparatus 801, 902 may include plural programmable processors. Alternatively, the processing apparatus 801, 902 may be, for example, programmable hardware with embedded firmware. The processing apparatus 801, 902 may be termed processing means. The processing apparatus 801, 902 may alternatively or additionally include one or more Application Specific Integrated Circuits (ASICs). In some instances, processing apparatus 801, 902 may be referred to as computing apparatus.

The processing apparatus 801, 902 is coupled to the memory (which may be referred to as one or more storage devices) 802, 904 and is operable to read/write data to/from the memory 802, 904. The memory 802, 904 may comprise a single memory unit or a plurality of memory units, upon which the computer readable instructions (or code) 802-2A, 904-2A is stored. For example, the memory 802, 904 may comprise both volatile memory 802-1 and non-volatile memory 802-2. For example, the computer readable instructions/program code 802-2A, 904-2A may be stored in the non-volatile memory 802-2, 904-2 and may be executed by the processing apparatus 801, 902 using the volatile memory 802-1, 904-1 for temporary storage of data or data and instructions. In some examples, a transmission buffer 802-1B of the TERMINAL DEVICE UE may be constituted by volatile memory 802-1 of the UE control apparatus 80. Examples of volatile memory include RAM, DRAM, and SDRAM etc. Examples of non-volatile memory include ROM, PROM, EEPROM, flash memory, optical storage, magnetic storage, etc. The memories in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

The computer readable instructions/program code 802-2A, 904-2A may be pre-programmed into the control apparatus 20. Alternatively, the computer readable instructions 802-2A, 904-2A may arrive at the control apparatus 80, 90 via an electromagnetic carrier signal or may be copied from a physical entity 1000 such as a computer program product, a memory device or a record medium such as a CD-ROM or DVD an example of which is illustrated in FIG. 10. The computer readable instructions 802-2A, 904-2A may provide the logic and routines that enables the entities devices/apparatuses 40, 42, 80, 90 to perform the functionality described above. The combination of computer-readable instructions stored on memory (of any of the types described above) may be referred to as a computer program product.

Embodiments of the technology described herein may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing apparatus" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined. Similarly, it will also be appreciated that flow diagrams described herein are examples only and that various operations depicted therein may be omitted, reordered and or combined.

Although the methods and apparatuses have been described in connection with an E-UTRA or 5G network, it will be appreciated that they are not limited to such networks and are applicable to radio networks of various different types.

It should be appreciated that the terms "first", "second", "third" etc, as used herein, do not, unless it is indicated otherwise, imply a particular order, but are instead intended to distinguish the element to which they refer from other such elements. Similarly, an element being labelled, for instance, "third", does not mean that examples which refer to such an element necessarily include a "first" and a "second".

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while various examples are described above, these descriptions should not be viewed in a limiting sense. Rather, there are several variations and modifications which may be made without departing from the scope of the present invention as defined in the appended claims.

The invention claimed is:

1. An apparatus comprising at least one processor and at least one memory storing instructions that, when executed by the at least one processor, cause the apparatus at least to perform:

transmitting a message relating to a change or addition of a primary cell of a secondary cell group, the message including (i) information indicative of a first user plane interruption time experienced by the apparatus and associated with the change or addition of the primary cell, and (ii) an indication of a first data radio bearer type to which the first user plane interruption time relates; and receiving, from a radio access node and prior to transmitting the message, a prior message including an indication of the first data radio bearer type for which the first user plane interruption time is to be reported by the apparatus.

2. The apparatus of claim 1, wherein the first user plane interruption time is indicative of a time elapsed between a) either receipt of a command to change or add the primary cell or receipt of a last user plane data packet prior to the change or addition of the primary cell, and b) a first user plane data packet received at the apparatus, via a data radio bearer of the first data radio bearer type, after the change or addition of the primary cell.

3. The apparatus of claim 1, wherein the instructions, when executed by the at least one processor, further cause the apparatus to perform:

receiving, from a radio access node and prior to transmitting the message, an indication of a first threshold user plane interruption time for use by the apparatus in determining whether to generate, for reporting to the radio access node, the information indicative of the first user plane interruption time.

4. The apparatus of claim 3, wherein the message is generated responsive to a determination that the first user plane interruption time exceeds the first threshold user plane interruption time.

5. The apparatus of claim 3, wherein the instructions, when executed by the at least one processor, further cause the apparatus to perform:

receiving, from the radio access node and prior to transmitting the message, an indication of a second threshold user plane interruption time for use by the apparatus in determining whether to generate, for reporting to the radio access node, information indicative of a second user plane interruption time associated with the change or addition of the primary cell and relating to a second data radio bearer type.

6. The apparatus of claim 1, wherein the prior message further includes an indication of a second data radio bearer type for which a second user plane interruption time is to be reported by the apparatus, the second user plane interruption time being associated with the change or addition of the primary cell and relating to the second data radio bearer type.

7. The apparatus of claim 1, wherein the prior message further includes an indication of a third data radio bearer type for which a third user plane interruption time, associated with the change or addition of the primary cell and relating to the third data radio bearer type, is not to be reported by the apparatus.

8. The apparatus of claim 1, wherein the message further includes a second user plane interruption time associated with the change or addition and an indication of a second data radio bearer type to which the second user plane interruption time relates.

9. The apparatus of claim 1, wherein the indication of the first data radio bearer type indicates one of a secondary cell group bearer, a master cell group bearer, and a split bearer.

10. An apparatus comprising at least one processor and at least one memory storing instructions that, when executed by the at least one processor, cause the apparatus at least to perform:

receiving a message relating to a change or addition of a primary cell of a secondary cell group, the message including (i) information indicative of a first user plane interruption time experienced by a terminal device and associated with the change or addition of the primary cell and (ii) an indication of a first data radio bearer type to which the first user plane interruption time relates; and transmitting, to the terminal device and prior to receiving the message, a prior message including an indication of the first data radio bearer type for which the first user plane interruption time is to be reported by the terminal device.

11. The apparatus of claim 10, wherein the instructions, when executed by the at least one processor, further cause the apparatus to perform:

transmitting, to the terminal device and prior to receiving the message, an indication of a first threshold user plane interruption time for use by the terminal device in determining whether to generate, for reporting to the apparatus, the information indicative of the first user plane interruption time.

12. The apparatus of claim 11, wherein the instructions, when executed by the at least one processor, further cause the apparatus to perform:

receiving, prior to transmission of the indication of the first threshold user plane interruption time to the terminal device, the indication of the first threshold user plane interruption time from a second radio access node, the second radio access node being associated with a target primary cell during the change or addition of the primary cell.

13. The apparatus of claim 10, wherein the instructions, when executed by the at least one processor, further cause the apparatus to perform:

utilising the information indicative of the first user plane interruption time associated with the change or addition of the primary cell and the indication of the first data radio bearer type to which the first user plane interruption time relates in connection with at least one of:

a) identifying another target primary cell for a future change of the primary cell;

b) determining a radio data bearer type for a future change or addition of the primary cell;

c) determining whether to perform bearer remapping during a future change or addition of the primary cell; or d) identifying another target primary cell for a future addition of a primary cell.

14. The apparatus of claim 10, wherein the message relates to the change of the primary cell, and wherein the instructions, when executed by the at least one processor, further cause the apparatus to perform:

forwarding, to a further radio access node associated with the primary cell, the information indicative of the first user plane interruption time associated with the change of the primary cell, and the indication of the first data radio bearer type to which the first user plane interruption time relates.

15. The apparatus of claim 14, wherein the instructions, when executed by the at least one processor, further cause the apparatus to perform:

receiving, from the further radio access node, an indication that a subsequent change of the primary cell is required and an indication of a bearer configuration to be utilised by a target primary cell, wherein the bearer configuration to be utilised by the target primary cell is determined by the further radio access node based on the information indicative of the first user plane interruption time associated with the change of the primary cell and the indication of the first data radio bearer type to which the first user plane interruption time relates.

16. The apparatus of claim 15, wherein the instructions, when executed by the at least one processor, further cause the apparatus to perform:

receiving, from the further radio access node, an indication of whether bearer remapping should be performed.

17. A method comprising:

transmitting, by a terminal device, a message relating to a change or addition of a primary cell of a secondary cell group, the message including (i) information indicative of a first user plane interruption time experienced by the terminal device and associated with the change or addition of the primary cell, and (ii) an indication of a first data radio bearer type to which the first user plane interruption time relates; and receiving, from a radio access node and prior to transmitting the message, a prior message including an indication of the first data radio bearer type for which the first user plane interruption time is to be reported by the terminal device.

18. The method of claim 17, wherein the first user plane interruption time is indicative of a time elapsed between a) either receipt of a command to change or add the primary cell or receipt of a last user plane data packet prior to the change or addition of the primary cell, and b) a first user plane data packet received at the apparatus, via a data radio bearer of the first data radio bearer type, after the change or addition of the primary cell.

* * * * *